United States Patent Office
3,686,168
Patented Aug. 22, 1972

3,686,168
PROCESS FOR THE MANUFACTURE OF MONOALKALI METAL SALTS OF α-CARBOXYBENZYLPENICILLIN
Albert E. Timreck, Rego Park, N.Y., assignor to Pfizer Inc., New York, N.Y.
No Drawing. Filed Dec. 30, 1969, Ser. No. 889,328
Int. Cl. C07d 99/16, 99/18
U.S. Cl. 260—239.1
2 Claims

ABSTRACT OF THE DISCLOSURE

An improved process for converting crude and amorphous forms of α-carboxybenzylpenicillin and salts thereof to crystalline monoalkali metal α-carboxybenzylpenicillin; with subsequent conversion of said salts to di-alkali metal α-carboxybenzylpenicillin. A composition for parenteral administration consisting of monosodium α-carboxybenzylpenicillin and sodium glycinate is also disclosed.

BACKGROUND OF THE INVENTION

This invention relates to a novel, convenient and economic process for producing salts of α-carboxybenzylpenicillin. More particularly, it relates to the production of crystalline monoalkali metal salts of α-carboxybenzylpenicillin and the conversion of said salts to di-alkali metal salts of α-carboxybenzylpenicillin. It also relates to a composition for parenteral administration.

The valuable broad spectrum penicillin, α-carboxybenzylpenicillin, is described in U.S. Pat. 3,142,673 and in British Pat. 1,004,670 along with the preparation of various salts of this valuable penicillin, including the di-alkali metal salts. U.S. Pat. 3,142,673 also describes the preparation of the mono-alkali metal salts. However, the monoalkali metal salts, as produced by the procedures of this reference, are amorphous rather than crystalline materials.

Other methods are available for the preparation of the crystalline monoalkali metal salts involving the treatment of a methyl isobutyl ketone or n-butanol solution of α-carboxybenzylpenicillin with an alkali metal salt of an organic acid, such as 2-ethyl hexanoic, caproic, oleic, ascorbic, glycolic, propionic, acetic, succinic, cinnamic, caprylic or citric acids. These salts must be used in equimolar ratios to the penicillin if the monoalkali salt is desired. The present invention, however, is an improvement of this process in that the use of an alkali metal salt of lactic acid may be used in proportions greater than equimolar ratios with only the crystalline monoalkali metal salts being formed with no appreciable di-alkali metal penicillin salt being formed. The monoalkali salt, e.g., monosodium α-carboxybenzylpenicillin, is rather insoluble and therefore also represents a preferred intermediate in the production of di-sodium salt or for use in pharmaceutical compositions.

A number of factors render difficult the formation of crystalline alkali metal α-carboxybenzylpenicillin salts. In particular, the penicillin itself is highly polar and is susceptible to degradation, particularly at elevated temperatures and at pH above 9 or below 4, forming decomposition products such as benzyl penicillin, penicilloic acid and penicillenic acid. Further, the alkali metal salts tend to be quite hygroscopic.

An amorphous salt is, in general, less desirable than is a crystalline form thereof from a preparative, sales, storage and use standpoint. The physical properties of an amorphous salt, such as ease of handling, dispersion in solution, and color of the salt, are generally inferior to those of a crystalline form of the same salt. Additionally, amorphous forms of a salt are frequently more hygroscopic than is a crystalline form a said salt.

For pharmaceutical usage, the above-mentioned inferior properties of an amorphous salt, relative to those of a crystalline form of the salt, are especially objectionable. The formation of acceptable dosage forms and the various pharmaceutically elegant preparations required and demanded by the medical and pharmaceutical professions, is rendered difficult with an amorphous salt.

In the case of α-carboxybenzylpenicillin, the disadvantages of amorphous forms of its alkali metal salts are of great concern since it is extremely effective broad spectrum penicillin. The preparation of crystalline forms of its monoalkali salts and, particularly, of its sodium salt is, therefore, of great importance to the pharmaceutical and medical professions.

SUMMARY OF THE INVENTION

It has been found that stable, crystalline forms of the monoalkali metal salts of α-carboxybenzylpenicillin, including its epimers or stereoisomers, can be conveniently prepared from crude and amorphous forms of α-carboxybenzylpenicillin and salts thereof. The process utilizes readily available equipment and is characterized by ease of manipulation, overall economy, and high quality of the crystalline salts. The stable crystalline products of the present invention are useful in the same dosage forms and amounts for the same purposes as are the amorphous prior art products, but do not share the above-mentioned shortcomings of the amorphous products.

By the term "α-carboxybenzylpenicillin and salts thereof" is meant not only the alkali metal salts, e.g., sodium and potassium, but also the alkaline earth salts (calcium, magnesium, barium), the ammonium salt and substituted ammonium salts, e.g., procaine, dibenzylamine, N,N'-dibenzylethylenediamine, N-ethylpiperidine, diethylamine, triethylamine and salts with other amines which have been used to form salts with benzylpenicillin. It further includes the mono- and di-salts of α-carboxybenzylpenicillin and its epimers. However, in view of the acidification step in the herein-described process which converts the above-mentioned salts to the acid form of α-carboxybenzylpenicillin, all the salts are equivalent in this process. From a practical standpoint, the crude and/or amorphous di-sodium salt of α-carboxybenzylpenicillin is the usual starting material for this process. A crude solution of the sodium salt obtained by the hydrolysis of an α-carboxybenzylpenicillin ester may often be the form in which the starting compound is furnished.

Preparation of the sodium and potassium salts of α-carboxybenzylpenicillin from aqueous solutions of α-carboxybenzylpenicillin and salts thereof, such as are produced by the methods of U.S. Pat. 3,142,673 and British Pat. 1,004,670 or by alkaline hydrolysis of an aryl ester of α-carboxybenzylpenicillin, according to the present invnetion, comprises:

(a) contacting an aqueous solution of from about 5 to 40% by weight of α-carboxybenzylpenicillin with an organic solvent selected from the group consisting of n-butanol, n-amyl alcohol, isoamyl alcohol, methyl ethyl ketone, and methyl isobutyl ketone,
(b) adjusting the pH from about 2 to 3.5,
(c) separating the organic layer,
(d) adding to said separated organic layer at least about an equivalent proportion of sodium or potassium lactate in the form of aqueous solution containing about 70–90% by weight of said lactate, and
(e) recovering the resulting precipitate of crystalline monosodium or mono-potassium α-carboxybenzylpenicillin.

The di-sodium or di-potassium salt of α-carboxybenzylpenicillin may then be prepared by:

(a) suspending the corresponding monosodium or mono-potassium salt, previously described, in water at a temperature of 0–10° C., adding a stoichiometric quantity of a compound selected from the group consisting of sodium or potassium hydroxide, isopropoxide, butoxide, bicarbonate and carbonate to resulting suspension and (b) recovering the resulting di-sodium or di-potassium salt of α-carboxybenzylpenicillin.

This invention further relates to a composition intended for parenteral administration consisting of an intimate dry blend of monosodium α-carboxybenzylpenicillin and a stoichiometric amount of sodium glycinate.

DETAILED DESCRIPTION OF THE INVENTION

The novel process of this invention can be used to prepare sodium and potassium salts of α-carboxybenzylpenicillin from aqueous solutions of α-carboxybenzylpenicillin and salts thereof, and from crude and amphoteric forms of α-carboxybenzylpenicillin and its salts.

It is necessary, for the purposes of this invention, that the aqueous solution of α-carboxybenzylpenicillin or salt thereof have a concentration of α-carboxybenzylpenicillin equivalent to from about 5 to about 40 percent of the acid form by weight. It is preferred, however, that the penicillin be present at a concentration of from about 25 to about 35 percent by weight.

A water-immiscible organic solvent, which can be n-butanol, amyl alcohol, isoamyl alcohol, methyl ethyl ketone or methyl isobutyl ketone is added to the above mentioned α-carboxybenzylpenicillin solution. The preferred organic solvent, however, is n-butanol. According to the preferred process of the present invention the aqueous penicillin solution is brought into contact with the solvent. The pH of the aqueous organic solvent solution is then adjusted to a pH value of from about 2 to about 3.5. The preferred range is from about 2.5 to about 3.0. The pH adjustment is accomplished by means of a mineral acid, such as hydrochloric, sulfuric and hydrobromic acids. The preferred acid is HCl at a 1 N to 2 N concentration. The temperature, during the pH adjustment is maintained at 0–10° C. with the preferred range being 0–5° C. Of course, the pH adjustment of the aqueous penicillin can be made before contacting the aqueous layer with the solvent but this is a less desirable procedure.

The two layers (water-organic solvent) are separated and the aqueous layers are extracted with additional organic solvent to insure a thorough extraction of the α-carboxybenzylpenicillin.

This extraction step can, of course, be conducted as a batch-wise or continuous process. Irrespective of the type of process used, a total volume of solvent equal to about one-half to one third the volume of the aqueous acid solution is preferred since it has been found to permit satisfactory extraction of the α-carboxybenzylpenicillin. Larger volumes can, of course, be used but necessitate the handling and recovery of unnecessary volumes of solvent. Smaller volumes are not desirable since the recovery of desired product is decreased. The volume of organic solvent is advantageously regulated so as to provide a concentration of α-carboxybenzylpenicillin in the extract of from about 20 to about 30 percent.

The organic solvent extract of α-carboxybenzylpenicillin contains a certain amount of dissolved water. This "wet" extract may be used in subsequent steps to produce the desired crystalline mono-alkali salt or dried to about 5 percent to about 10 percent water by drying the organic solvent extract with anhydrous sodium sulfate, the preferred drying agent in this process. Other drying agents, such as anhydrous calcium sulfate and magnesium sulfate can also be used. An alternate method to reduce the water content consists of removing the water by azeotropic distillation in vacuo. The water content with respect to the concentration of the organic solvent can also be lowered by the addition of dry solvent. Additionally, the organic extract may be carbon treated to remove impurities which may be present.

The organic solvent extract is then treated with a concentrated aqueous solution of the appropriate alkali metal salt of lactic acid to form the desired crystalline monoalkali salt of α-carboxybenzylpenicillin. Suitable salts are the sodium and potassium salts of lactic acid. The preferred salt, however, is sodium lactate. The lactate salt is dissolved in water to form a concentrated solution in the range of from about 70 to about 90% w./v. The preferred range, however, is 75–85% w./v. This is then added to the organic solvent extract. The temperature is preferably maintained at 0° to 10° C. with the especially preferred range being 5° to 10° C. A molar ratio of 1:1 or slight excess of the lactate salt to the penicillin is used but greater proportions may be used, as only the monoalkali salt will form under these conditions. This is in contrast to the stoichiometric quantities that are required when using alkali metal salts or various other acids. The crystalline monosodium or monopotassium salt which precipitates is separated, e.g., by filtration, and may then be washed or repulped with an organic solvent such as acetone or isopropanol, then dried. Other solvents, such as n-butanol, ethyl acetate and methyl isobutyl ketone, can also be used.

The products are conveniently dried at about 30° to 65° C. Other methods commonly used in the art are also applicable, as those skilled in the art will recognize, e.g., air-drying, drying under nitrogen, drying at 25° C. in vacuo.

The di-alkali metal salt is prepared by suspending the corresponding monosodium or monopotassium salt in water preferably at a concentration of from about 10 percent to 50 percent, especially about 20 to 30 percent. The temperature is maintained at about 0° to 10° C. with about 0° to about 5° the preferred temperature range. To this suspension stoichiometric quantities of sodium or potassium hydroxide, isopropoxide, butoxide, bicarbonate or carbonate to provide the corresponding di-alkali metal salt are added, with constant agitation. The preferred agent, however, is sodium hydroxide.

The resultant disodium salt thus formed may be isolated by means of lyophilization or any other suitable means such as spray-drying, vacuum drying, or by dilution with a water miscible solvent such as n-propanol, isopropanol, or acetone, whereby disodium salt is precipitated and recovered in crystalline form. Sterile salts may be prepared by the use of suitable sterilizing techniques such as sterile filtration before the drying step.

The novel crystalline monoalkali metal salts obtained in this invention are useful in providing new and elegant intramuscular and intravenous dosage forms of α-carboxybenzylpenicillin. The special advantage of the use of monosodium α-carboxybenzylpenicillin in intramuscular dosage forms, lies in the fact that it affords a sustained depot effect and functions in such a way as to provide an elegant repository dosage form.

A composition intended for parenteral administration is prepared by the intimate blending of sterile monosodium α-carboxybenzylpenicillin and a stoichiometric amount of sodium glycinate. The composition is extremely stable and may be stored for extended periods of time without loss of potency. When water is added the soluble di-sodium salt is formed. The usual quantity per vial is from about 0.500 gm. to about 5.0 gm. of α-carboxybenzylpencillin activity. For a single dose unit, the preferred quantity per vial, however, is 1.2 gm. of α-carboxybenzylpenicillin activity to which 1.5 ml. of water is added to yield a solution having 500 mg./ml. of α-carboxybenzylpenicillin. The addition of 3.6 ml. of water gives a solution containing 250 mg./cc. of α-carboxybenzylpenicillin.

The following examples are given to further illustrate the invention:

EXAMPLE I

Amorphous di-sodium α-carboxybenzylpenicillin, 250 g. (0.593 mole), is dissolved in 700 ml. of cold water at 0–5° C., to which is added 700 ml. of n-butanol followed by acidification to pH 2.4 with 950 ml. of cold 2 N HCl. The two layers (water-butanol) are separated and the aqueous layer is extracted twice with 150 ml., each time of n-butanol. The combined n-butanol extracts are dried over 450 grams of anhydrous sodium sulfate with stirring for one hour. The drying agent is filtered off and the cake is washed with 200 ml. of n-butanol which is combined with the other butanol extracts. The n-butanol solution is cooled to 5° C. and seeded with crystals of monosodium α-carboxybenzylpenicillin. Sodium lactate, 91 ml. of 80% w./v. (0.652 mole) is added slowly with constant stirring over a 20–30 minute period. A finely divided crystalline precipitate forms. Stirring is continued for one hour and the precpitate of crystalline monosodium α-carboxybenzylpenicillin is filtered and washed with 200 ml. of butanol and then dried in vacuo.

EXAMPLE II

Monosodium α-carboxybenzylpenicillin, 82 g. (0.190 mole) is suspended in 190 ml. of cold water at 0–5° C. and cold 1 N NaOH, 190 ml. (0.190 mole) is slowly added with stirring to raise the pH to 7.3. The volume of the solution is brought up to 480 ml. with cold water and filtered through a sterile filter. The disodium penicillin is then recovered by freeze-drying.

EXAMPLE III

The procedure of Example I is repeated but using a pH adjustment of 3.2 in the initial acidification step. Substantially, the same results are obtained but with a somewhat reduced yield.

EXAMPLE IV

Repetition of the procedure of Example I but using 1.0 mole of sodium lactate in place of 0.652 mole again produces the crystalline monosodium salt.

EXAMPLE V

The procedure of Example II is repeated using the following with substantially the same results obtained: sodium isopropoxide, sodium n-butoxide, sodium bicarbonate and sodium carbonate.

EXAMPLE VI

The procedure of Example I is repeated, substituting potassium lactate for sodium lactate, to produce the crystalline monopotassium penicillin salt. The corresponding di-potassium salts is then produced using the procedure of Example II, using potassium hydroxide in place of sodium hydroxide.

EXAMPLE VII

Following the procedure of Example I but using methyl ethyl ketone instead of n-butanol, the crystalline monosodium salt is again produced.

EXAMPLE VIII

The procedure of Example I is repeated eliminating the drying of the combined n-butanol extracts and diluting with an equal volume of dry n-butanol. Substantially the same results are obtained.

EXAMPLE IX

Boric acid (61.8 g.) and potassium chloride (74.56 g.) are dissolved in water and sufficient water added to the solution to bring the volume to two liters. A sufficient amount of 0.5 N sodium hydroxide is added to adjust the solution to pH 9.0. α-Carboxybenzylpenicillin phenyl ester N-ethylpiperidine salt is dissolved in this buffer solution and the mixture stirred at room temperature (25° C.) for 2.5 hours. The reaction mixture becomes more acidic as hydrolysis occurs until, at the cessation of reaction, the mixture reaches pH 8.45. The solution contains crude di-sodium salt of α-carboxybenzylpenicillin.

The reaction is cooled to 0°–10° C. and n-butanol (700 ml.) is added followed by sufficient 2 N HCl to acidify the mixture to pH 2.4. The procedure of Example I is then followed to produce crystalline monosodium α-carboxybenzylpenicillin.

EXAMPLE X

Amorphous di-sodium α-carboxybenzylpenicillin, 250 g. (0.593 mole), is dissolved in 700 ml. of cold water at 0°–5° C., to which is added 500 ml. of n-butanol followed by acidification to pH 2.4 with 950 ml. of cold 2 N HCl. The two layers (water-butanol) are separated and the aqueous layer is extracted twice with 100 ml. portions of n-butanol. To the combined n-butanol extracts is added an additional 700 ml. of n-butanol. This solution is then cooled to 5° C., and seeded with crystals of monosodium α-carboxybenzylpenicillin. Sodium lactate, 91 ml. of 80% w./v., is added with stirring over a 20–30 minute period. A finely divided crystalline precipitate forms and is isolated by filtration. The precipitate of crystalline monosodium α-carboxybenzylpenicillin is then washed with 200 ml. of butanol and dried.

EXAMPLE XI

An intimate blend of monosodium α-carboxybenzylpenicillin and a stoichiometric quantity of sodium glycinate is prepared in the following amounts:

| | Gm./vial |
|---|---|
| Mono-sodium α-carboxybenzylpenicillin | 1.410 |
| Sodium glycinate | 0.376 |
| | 1.786 |

The addition of 1.5 ml. of water gives a clear solution containing penicillin equivalent to 500 mg./ml. as α-carboxybenzylpenicillin acid.

Samples placed under stability testing show excellent biological potency retention.

No loss in potency is noted during three months' testing at 50° C., or nine months' testing at 37° and 25°.

What is claimed is:

1. A process for making crystalline monosodium or monopotassium α-carboxybenzylpenicillin, said process comprising the steps of contacting an aqueous solution of from about 5 to 40% by weight of α-carboxybenzylpenicillin with an organic solvent selected from the group consisting of n-butanol, n-amyl alcohol, isoamyl alcohol, methyl ethyl ketone, and methyl isobutyl ketone adjusting the pH to form about 2 to 3.5, separating the organic layer, adding to said separated organic layer at least about an equivalent proportion of sodium or potassium lactate in the form of aqueous solution containing about 70–90% by weight of said lactate, and recovering the resulting precipitate of crystalline monosodium or monopotassium α-carboxybenzylpenicillin.

2. The process of claim 1 wherein said solvent is n-butanol and said lactate is sodium lactate.

References Cited

UNITED STATES PATENTS

| 3,142,673 | 7/1964 | Hobbs | 260—239.1 |
| 3,282,926 | 11/1966 | Brain et al. | 260—239.1 |

NICHOLAS S. RIZZO, Primary Examiner

U.S. Cl. X.R.

424—271